April 14, 1959 — R. ASHTON — 2,881,580
DRAPER-TYPE PICK-UP

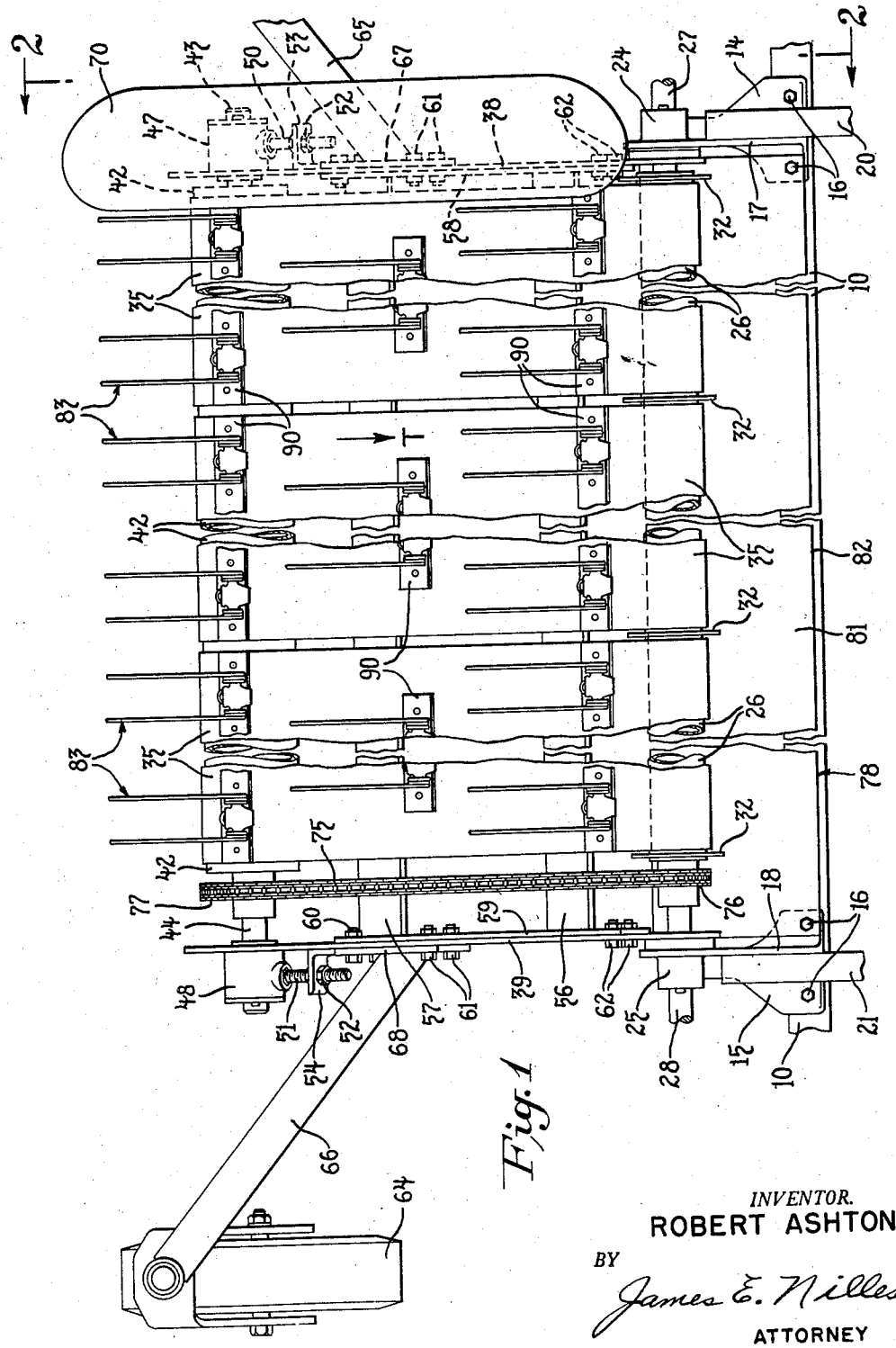

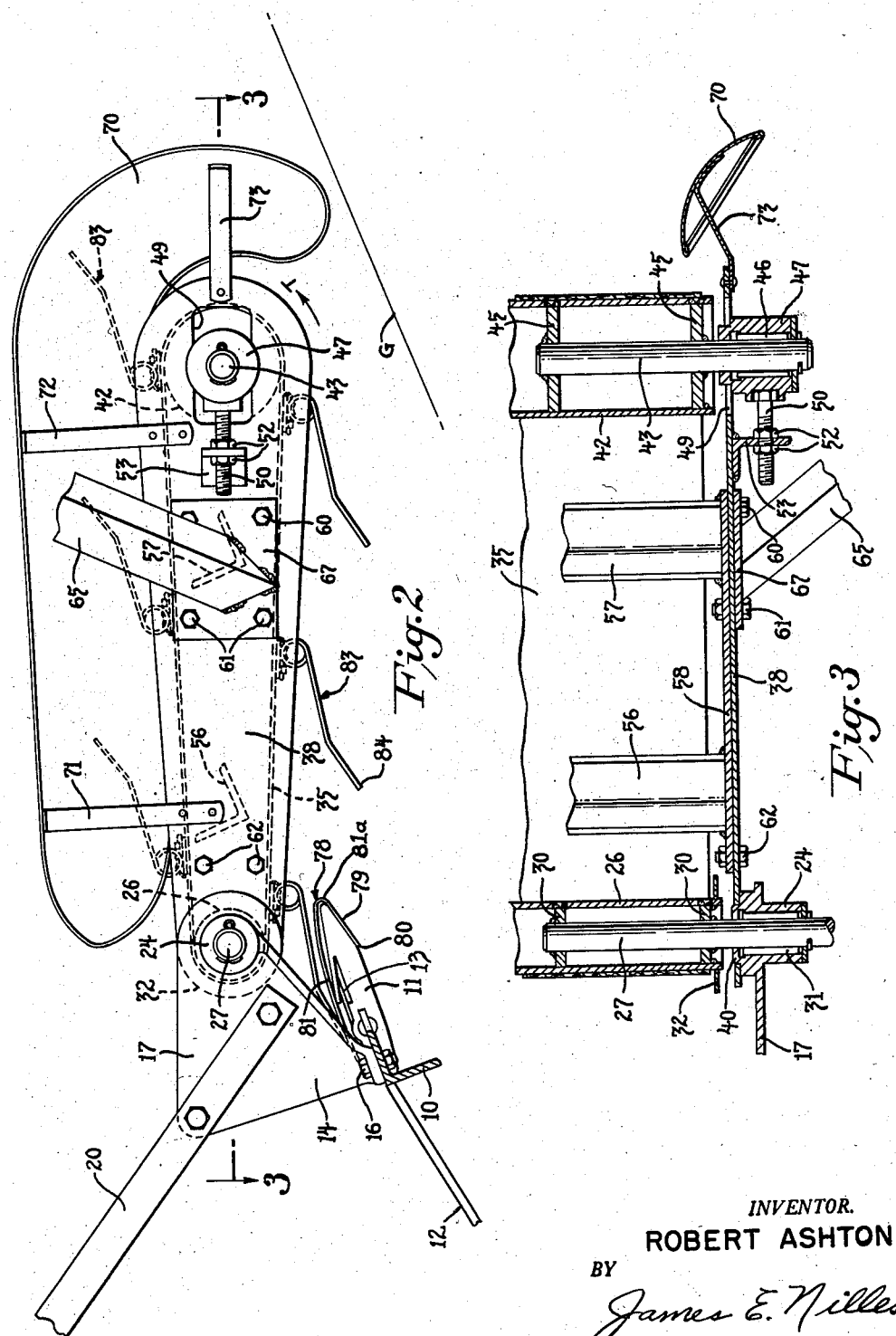

Filed Aug. 6, 1956 — 3 Sheets-Sheet 3

INVENTOR.
ROBERT ASHTON
BY James E. Nilles
ATTORNEY.

though the embodiment of the invention illustrated has the pick-up mounted on a harvester table, it will be under-

United States Patent Office 2,881,580
Patented Apr. 14, 1959

2,881,580

DRAPER-TYPE PICK-UP

Robert Ashton, Toronto, Ontario, Canada, assignor to Massey-Ferguson Inc., a corporation of Maryland Application August 6, 1956, Serial No. 602,231

9 Claims. (Cl. 56—364)

This invention relates to pick-up mechanisms for traveling harvesters such as combines and more particularly to grain pick-ups of the type comprising a flexible endless conveyor which travels around fore and aft spaced rollers and is provided with crop-engaging fingers adapted to lightly brush the ground and pick up crop material therefrom. More specifically, a principle aspect of the invention is concerned with the means for fastening these fingers to the belt.

An object of this invention is to provide means for quickly, easily and without requiring any tools, replace the fingers on the endless conveyor belt of a pick-up.

Another general object of the invention is to provide an improved pick-up of the above type which is economical to manufacture, simple in operation and easily repaired and maintained.

Still another object of the invention is to provide a pick-up assembly of the above type which can be readily attached to the harvesting table without removing the cutter mechanism of the table or otherwise disturbing other component parts.

Other objects and advantages of this invention will become more apparent from the following detailed description and attached sheets of drawings wherein a form of the invention is illustrated. Accordingly, the present invention may be considered as comprising the various constructions, combinations, or subcombinations of parts as is hereinafter more fully set forth in the detailed description and in the claims, reference being had to the accompanying drawings in which:

Figure 1 is a plan view of a pick-up built in accordance with the invention, certain parts broken away for clarity.

Figure 2 is a right side elevational view taken on line 2—2 of Figure 1, but on an enlarged scale.

Figure 3 is a sectional view taken on line 3—3 of Figure 2.

Figure 4:
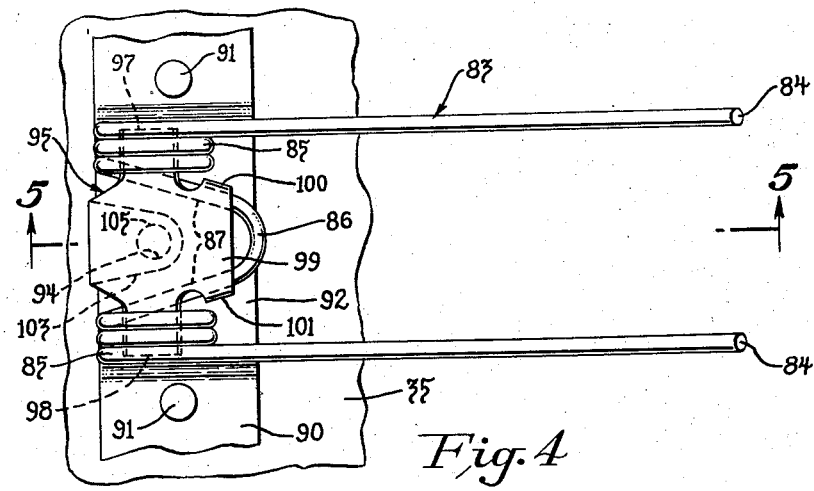
Figure 4 is generally a plan view of one of the tooth attaching means shown in Figure 1, but on an enlarged scale.
Figure 5:
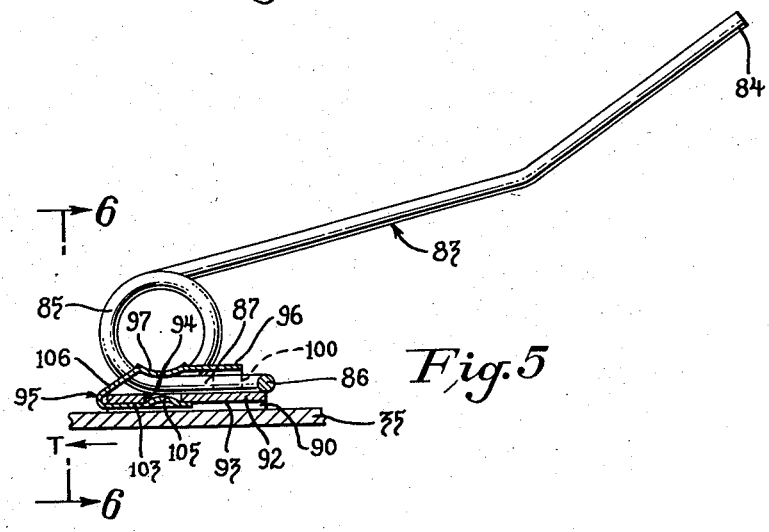
Figure 5 is an elevational, sectional view taken on line 5—5 of Figure 4.
Figure 6:
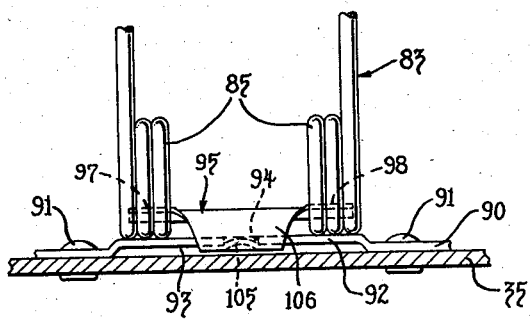
Figure 6 is a view taken generally on line 6—6 of Figure 5.

Referring more particularly to Figures 1 and 2, a conventional angle iron bar 10 is rigidly secured across the front edge of the harvester table 12 and has attached thereto the conventional sickle guards 11, through which the knife 13 reciprocates in the well known manner to provide a cutting mechanism.

The pick-up assembly is detachably secured to the support structure 10 by its laterally spaced attaching brackets 14, 15, the bolt means 16 extending through registering apertures in the bar 10 and the brackets. The brackets include a vertical plate-like portion 17, 18 which are rigidly secured to a rearward part (not shown) of the harvester table by the braces 20, 21. At the forward ends of the brackets 14, 15 and integral therewith are hub portions 24, 25 in which is rotatably mounted the rear drive roller 26 by means of its stub shafts 27, 28 extending from its end. Shafts 27, 28 are suitably secured within rear roller 26 by the discs 30, and are supported in the hubs 24, 25 by anti-friction members 31. As will appear, the shafts act as a pivot about which the pick-up assembly rises and falls as it moves over the ground G. Roller 26 has a belt retaining disc 32 secured at each of its ends and also at locations along its length and acts to drive the flexible endless belts 35 which are trained over it. The number of belts 35 may be varied in accordance with the width of the pick-up, and three are used in the embodiment of the invention shown here.

The pick-up frame includes a pair of laterally spaced and vertically positioned side plates 38, 39 which are swingably supported on an inwardly extending collar portion 40 (Figure 3) of the hubs 24, 25. Plates 38, 39 extend generally forwardly and downwardly in the operating position as shown in Figure 2 and have a front roller 42 rotatably and adjustably supported between their front ends. Shafts 43, 44, secured within roller 42 by the discs 45, are rotatably supported in anti-friction members 46 in the bearing blocks 47, 48 respectively. Blocks 47, 48 are slidably adjustable in the slots 49 of plates 38, 39 by means of the adjusting bolts 50, 51 which are held by nuts 52 in the brackets 53, 54, respectively. Belts 35 are also trained around the front roller and are adjusted as to tautness by the adjusting bolts 50, 51.

The side plates 38, 39 are rigidly held in spaced apart relation by the two angle iron cross braces 56, 57 to the adjacent ends of which are welded the plates 58, 59. These plates in turn are secured by bolt means 60, 61 and 62 to the side plates 38, 39. The rectangular rigidifying structure formed by angles 56, 57 and plates 58, 59 add considerable rigidity to the assembly, yet at the same time permits a certain amount of flexing of one end of the pick-up relative to the other. A ground supporting wheel 64 (only one shown) is provided at each side of the pick-up and is carried by the square tubular arms 65, 66 which are welded at their inner ends to attaching plates 67, 68. Bolt means 60, 61 also detachably secure plates 67, 68 to the side plates 38, 39.

A divider 70 is provided at the right end of the pick-up and is secured to side plate 38 by the strips 71, 72 and 73. A similar divider is provided for the left end of the pick-up but has been omitted for the sake of clarity in the drawing. At the other side of the pick-up a connecting chain 75 is trained over sprockets 76 and 77 fast on shafts 28, 44 and functions to insure positive and synchronous rotation of the rollers 26 and 42. As previously mentioned, roller 26 is positively driven through one of its shafts 27 or 28 in the well known manner from a power source on the harvester.

The entire pick-up assembly can be conveniently mounted on the harvesting table without requiring the removal of the knife or guards as is necessary in many grain harvesters. It will be noted that the assembly is secured directly to the upper or top side of the cutting mechanism, more particularly the support bar 10 thereof. In accordance with one feature of the invention, an elongated shield 78 of generally U-shaped cross section is provided which fits over the guards 11 (Figure 2) and substantially encloses that part of the cutting mechanism located between the attaching brackets 14, 15. The shield has a lower side 79 (Figure 2) which extends rearwardly and terminates at 80. The shield thus embraces and encloses a substantial portion of the cutting mechanism, namely, the upper side, the leading edge and a portion of the lower side, and this construction prevents the accumulation or "balling up" of material on the cutting mechanism. As shown in Figure 1, the rear upper portion 81 of the shield extends rearwardly from the leading round nose portion 81a and terminates as at 82 and provides a smooth shelf to which the crop material is delivered by the rearwardly moving upper flight of the conveyor belts. The shield is rigidly held in place by some of the bolts 16 and is easily attached and removed along with the rest of the assembly. In operation, and as shown in Fig. 2, the pick-up fingers 83 contact the upper surface of the shield after they have discharged their crop material in passing over the rear roller. The fingers then simply slide over the smooth shield without interference with the cutting mechanism.

The pick-up fingers indicated generally at 83 are of the resilient, double coil type having crop-engaging ends 84, coiled portions 85 and a common center U-shaped loop portion having a bight 86 in the center of the double tooth. The legs 87 of the U-shaped portion diverge inwardly toward the bight. In use these fingers are continuously subjected to a considerable amount of twisting and flexing and must be securely fastened to the flexible material to prevent their loss in the field. At the same time these fingers 83 occasionally break or bend and require replacement which must be accomplished with a minimum amount of "down time" and without the necessity for special, if any, tools. In accordance with another object of this invention, means are provided for securely fastening these fingers to the conveyor which is economical to manufacture and readily assembled. This means further provides easy removal and replacement of the fingers without the use of any tools.

A series of metal straps 90 are secured as by rivets 91 in parallelism across the width of the outer side of the flexible conveyor 35 and are spaced apart in the direction of belt travel indicated by arrow T. The straps 90 are provided along their length with raised portions 92 which have been pressed or stamped therein and which provide a space 93 between the outer surface of the belt and the strap 90. The raised portions 92 are provided with an interengaging locking part in the form of an aperture 94 extending through its central portion.

The tooth 83 is attached to the strap 90 by means of a U-shaped securing clip 95 which includes an outward side or leg 96 overlying the common central portion of the spring and which has wing portions 97, 98 extending from opposite sides of its central portion 99. Wings 97, 98 extend through coils 85 which encircle the wings when in the assembled relationship. The outer central portion 99 also has a pair of inwardly turned flanges 100, 101 straddling the U-shaped loop portion formed by legs 87 and bight 86. The clip also has an inner leg 103 which extends between the belt 35 and the raised portion 92 of the strap. This leg 103 has an interengaging mating part in the form of a projection 105 pressed therein. In the assembled position the projection 105 is adapted to be securely snapped into holding position in the aperture 94 of strap 90. Thus by the spring action of the clip 95, the tooth 83 is firmly held against the strap 90 and prevented from twisting relative thereto, and yet is easily removed therefrom by hand. It will be noted that the interconnecting bight portion 106 of the clip is placed at the leading edge in regard to the direction of belt travel and is furthermore inclined rearwardly and upwardly so as to shed the crop material passing thereover and prevent entanglement therewith. The relative movement of the crop over the fingers in a rearward direction tends to force the clip even more tightly against the strap 90. In other words, by placing the clip over the leading edge of the strap, inadvertent disassembly is precluded.

It should be understood that it is not intended to limit the invention to the above described forms and details, and that the invention includes such other forms and modifications as are embraced by the scope of the appended claims.

I claim:

1. In a pick-up device for a harvester, comprising a flexible endless belt adapted to travel upwardly and rearwardly to deliver crops to said harvester during operation, the combination of a plurality of transverse metal straps secured to said belt and having raised portions thereon, spring fingers having a pair of coils and a central loop portion bearing against said raised portion, a metal U-shaped clip having an outer leg overlying said loop portion and inner leg between said strap and said belt, interengaging parts on said clip and said strap whereby said fingers and strap are rigidly and detachably secured together by said clip.

2. A device as defined in claim 1 further characterized in that said outer leg of said clip also includes a wing portion extending through each of said coils and flange portions which securely embrace said loop portion.

3. A device as defined in claim 1 further characterized in that said clip also has a bight portion connecting its inner and outer legs, said bight portion forming the leading edge of said clip in the direction of said belt travel.

4. In a pick-up device for a harvester, comprising a flexible endless belt adapted to travel upwardly and rearwardly to deliver crops to said harvester during operation, the combination of a plurality of transverse metal straps secured to said belt and having raised portions thereon, spring fingers having a pair of coils and a central loop portion bearing against said raised portion, a metal U-shaped clip having an outer leg overlying said loop portion, said outer leg including a wing portion extending through each of said coils and flange portions which embrace said loop portion, said clip also having an inner leg between said strap and said belt, said clip further having a bight portion which forms the leading edge of said clip in the direction of belt travel, interengaging parts on said clip and said strap whereby said fingers and strap are rigidly and detachably secured together by said clip.

5. A crop pick-up device of the flexible endless conveyor type including, a transverse strap secured to the outside surface of said conveyor and having a raised portion thereon, a double tooth finger having a pair of coils and a central U-shaped loop portion bearing on said raised portion, a metal clip having inner and outer legs spaced apart to embrace said loop portion and said raised portion, said inner leg and said raised portion having complementary interengaging locking parts.

6. A crop pick-up device of the flexible endless conveyor type including, a transverse strap secured to the outside surface of said conveyor and having a raised portion thereon, a double tooth finger having a pair of coils and a central loop portion bearing on said raised portion, a metal clip having inner and outer legs spaced apart to embrace said loop portion and said raised portion, said inner leg and said raised portion having complementary interengaging locking parts, said outer leg having oppositely projecting wings extending through said coils and also having inwardly turned flanges embracing said loop portion.

7. A crop pick-up device of the flexible endless conveyor type including, a transverse strap secured to the outside surface of said conveyor and having a raised portion thereon, a double tooth finger having a pair of coils and a central loop portion bearing on said raised portion, a U-shaped metal clip having an outer leg and an inner leg connected by a bight portion, said legs being spaced apart to holdingly embrace said loop portion and said raised portion, said inner leg and said raised portion having complementary interengaging locking parts, said outer leg having oppositely extending wings in holding engagement with said coils and also having inwardly turned flanges embracing said loop portion.

8. A device as defined in claim 7 further characterized in that said bight portion is disposed in the leading direction as regards belt travel thereby tending to prevent accumulation of crop material therearound and preventing disengagement of said clip when said pick-up is operative.

9. As an article of manufacture, a generally U-shaped clip for securing a double coil spring tooth to an endless belt conveyor strap including, an outer leg elongated in the direction of the axis of the belt having a wing extending laterally from each of opposite sides thereof and positioned to extend into the coils of the tooth to hold the coils against said strap, said outer leg also having inwardly turned flanges at opposite sides spaced from said wings and positioned to embrace a portion of said spring between the coils, an inner leg having a locking part positioned to engage said strap, a leading bight portion connecting said legs at their adjacent ends, said bight portion retaining said legs in position to holdingly receive said strap and a portion of said double coil spring tooth between them.

References Cited in the file of this patent

UNITED STATES PATENTS

| | | |
|---|---|---|
| 1,819,432 | Mickle | Aug. 18, 1931 |
| 2,233,837 | Fuhrhop | Mar. 4, 1941 |
| 2,253,797 | Melroe | Aug. 26, 1941 |
| 2,364,303 | Martin | Dec. 5, 1944 |
| 2,432,653 | Bloom | Dec. 16, 1947 |